June 12, 1928.
T. W. SUKUMLYN
VARIABLE CONDENSER
Filed Oct. 29, 1925
1,673,213
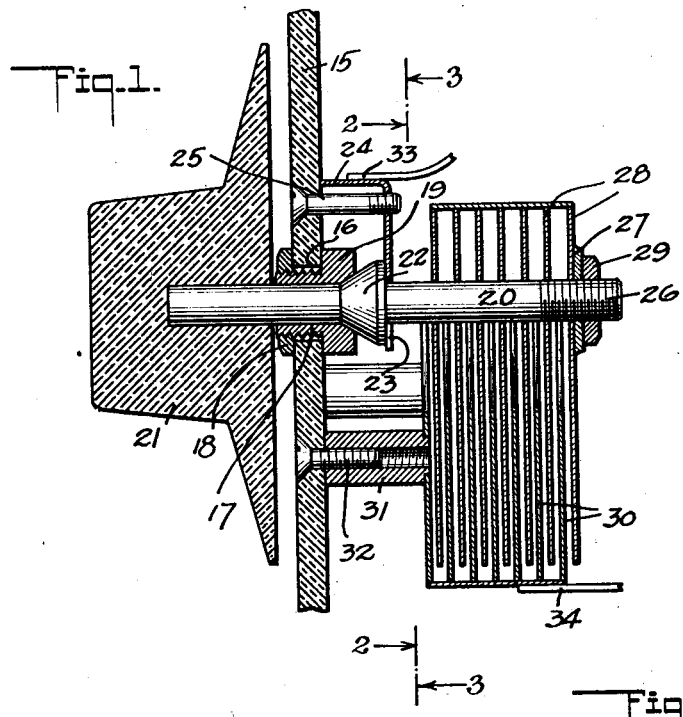
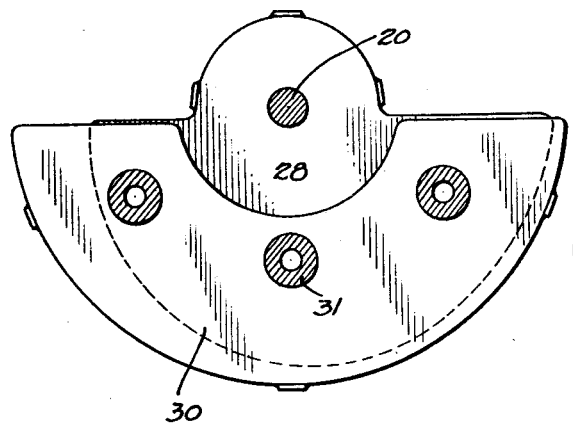
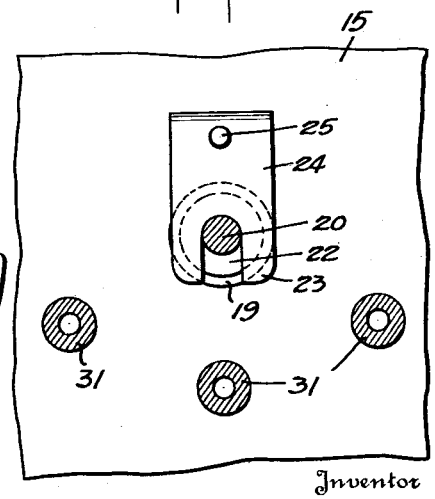
Inventor
THOMAS W. SUKUMLYN
By Munn & Co.
Attorney Patented June 12, 1928.

1,673,213

UNITED STATES PATENT OFFICE.

THOMAS W. SUKUMLYN, OF LOS ANGELES, CALIFORNIA.

VARIABLE CONDENSER.

Application filed October 29, 1925. Serial No. 65,625.

My invention relates to variable condensers for radio apparatus of the type having a stator and rotor composed of plates, with the rotor plates rotatable to vary the capacity of the condenser. In condensers of this type as heretofore proposed, two supporting frames, as well as numerous screws, nuts and bushings, have been necessary to the proper supporting and mounting of the condenser plates on the insulating panel of a radio receiving set. Aside from the expense of manufacturing and assembling these parts, they greatly increase the chance of current losses through improper connections and insulation.

It is a purpose of my invention to provide a variable condenser of the above type which eliminates certain parts and reduces in number other parts necessary to the mounting of the condenser plates on an insulating panel, whereby the possibility of current losses is reduced to a minimum, the manufacturing cost lowered, and the assembling operation rendered extremely simple.

It is also a purpose of my invention to provide a variable condenser which permits of an adjustment of the condenser plates to compensate for any inaccuracies in the manufacture of the condenser and its mounting so that when in applied position the rotor plates will be properly spaced from the stator plates to produce the required di-electric.

I will describe only one form of variable condenser embodying my invention, and will then point out the novel features thereof in claims.

In the drawings Figure 1 is a view showing in central vertical section one form of variable condenser embodying my invention in applied position to an insulating panel;

Figures 2 and 3 are sectional views taken on the lines 2—2 and 3—3 of Figure 1.

Referring to the drawings, in which similar reference characters refer to similar parts in each of the views, my invention in its present embodiment is shown applied to the conventional panel 15 of a radio receiving set, such panel being formed of insulating material provided with an opening 16 in which is a bushing 17 exteriorly threaded to receive a nut 18 and provided with a head 19 which co-operates with the nut to securely clamp the bushing within the opening. A shaft 20 is rotatably mounted in the bushing 17 and is of such length as to extend to the opposite sides of the panel 15, where at the outer side of the panel the shaft is provided with a dial 21 of insulating material by which the shaft can be manually rotated. Between its ends the shaft is provided with a conical bearing member 22 rotatably fitted in the head 19 and urged to this position by means of the bifurcated end 23 of an L-shaped bracket 24 secured to the inner side of the panel by means of a screw 25. It will be understood that the bracket and head 19 permit unrestricted rotation of the bearing 22 but prevent lengthwise movement thereof whereby the shaft 20 is secured against longitudinal displacement from the bushing.

As shown in Figure 1, the inner end of the shaft is exteriorly threaded, as indicated at 26, for threaded engagement with a collar 27 welded or otherwise secured to one of a plurality of plates 28 constituting the rotor of the condenser. The several parts of the rotor are formed with openings to receive the shaft 20, and a nut 29 engages a threaded end of the shaft and abuts the collar 27 to lock the rotor as a unit to the shaft.

The rotor plates are movable between stator plates 30 rigidly connected to each other and rigidly mounted on the inner side of the panel 15 through the medium of a plurality of posts 31, tubular in form and interiorly threaded to receive screws 32 which extend through the panel, as clearly shown in Figure 1.

In practice, the condenser is operated in the usual manner to vary its capacity by rotation of the shaft 20 through the medium of the dial 21 whereby the rotor plates can be moved into and out of the stator plates, the pressure exerted on the bearing 22 by the bracket 24 operating to frictionally retain the rotor in any adjusted position. To compensate for inaccuracies in the manufacture of the parts comprising the condenser and its mounting, the rotor is adjustable longitudinally on the shaft 20 to properly space its plates with respect to the plates of the stator to set up the required di-electric. This adjustment of the rotor can be effected by first unscrewing the nut 29 to disengage the collar 27 whereby the shaft 20, upon being rotated while holding the rotor, causes the latter to be fed longitudinally on the shaft in one direction or the other, depending upon the direction of rotation of the shaft. In this manner longitudinal adjustment of the rotor plates 28 is effected so that they are all disposed in spaced parallel reation to the plates of the stator. Current may be supplied to the condenser through terminals 33 and 34 welded, respectively to the bracket 24 and the stator 30.

If it is desired to dismount the condenser for any reason, it will be manifest that by removing the bracket 24 and the dial 21 the shaft 20 is free to be withdrawn from the bushing 17, and by removing the nut 29 that the rotor can be detached from the shaft. The stator is capable of being readily removed from the panel upon withdrawal of the screws 32.

Although I have herein shown and described only one form of variable condenser embodying my invention, it is to be understood that various changes and modifications may be made herein without departing from the spirit of the invention and the spirit and scope of the appended claims.

I claim:

1. In combination, a panel, a variable condenser including a stator and a rotor, and means for mounting the condenser on the panel for actuating the rotor comprising a shaft rotatable in the panel, detachable means secured to the panel for securing the shaft against displacement from the panel, and a connection between the shaft and rotor by which the rotor can be adjusted longitudinally to vary the spacing of its plates with respect to the stator plates.

2. In combination, a panel, a variable condenser including a stator and a rotor, and means for mounting the condenser on the panel for actuating the rotor comprising a shaft rotatable in the panel, detachable means for securing the shaft against displacement from the panel, and a threaded connection between the shaft and rotor by which the rotor can be adjusted longitudinally to vary the spacing of its plates with respect to the stator plates.

3. A variable condenser comprising a bushing adapted to engage within the opening of a panel and having a nut detachable from one end of the bushing and a head formed on the other end of the bushing, a shaft rotatable in the bushing and having a conical bearing member rotatably fitted in the head, a dial on one end of the shaft, a rotor threaded on the shaft to permit adjustment thereof longitudinally on the shaft, a nut engaging the rotor to lock the latter in any adjusted position, a bracket adapted to be detachably secured to the panel and having a bifurcated end receiving the shaft and engaging the bearing member to co-operate with the head in securing the shaft against longitudinal movement, a stator, posts fixed to the stator, and fastening members adapted to extend through the panel and engaging said posts for rigidly securing the stator to the panel.

THOMAS W. SUKUMLYN.